United States Patent [19]

Lee

[11] Patent Number: 5,621,584
[45] Date of Patent: Apr. 15, 1997

[54] TAPE LOADING DEVICE FOR USE IN A VIDEO CASSETTE RECORDER

[75] Inventor: Hyun-Moo Lee, Incheon, Rep. of Korea

[73] Assignee: Daewoo Electronics Co., Ltd., Seoul, Rep. of Korea

[21] Appl. No.: 386,511

[22] Filed: Feb. 8, 1995

[30] Foreign Application Priority Data

Feb. 8, 1994 [KR] Rep. of Korea .................. 94-2450

[51] Int. Cl.⁶ .................................................. G11B 15/665
[52] U.S. Cl. .................................................. 360/85
[58] Field of Search .................................................. 360/85

[56] References Cited

U.S. PATENT DOCUMENTS

| | | | |
|---|---|---|---|
| 4,912,578 | 3/1990 | Katohno et al. | 360/85 |
| 4,975,793 | 12/1990 | Oka | 360/85 |
| 5,050,008 | 9/1991 | Kondo | 360/85 |
| 5,381,283 | 1/1995 | Lee | 360/85 |

Primary Examiner—Robert S. Tupper
Attorney, Agent, or Firm—Anderson, Kill & Olick P.C.

[57] ABSTRACT

A tape loading device for a video cassette recorder ("VCR") provides a simplified structure and replaces a metal pin with a resin pin molded by an outsert molding method. The tape loading device is characterized in that an intermediate gear drives a pair of loading gears and a number of resin pins supports the intermediate gear and the loading gears.

2 Claims, 3 Drawing Sheets

TAPE LOADING DEVICE FOR USE IN A VIDEO CASSETTE RECORDER

FIELD OF THE INVENTION

The present invention relates to a tape loading device for use in a video cassette recorder("VCR"); and, more particularly, to a tape loading device having a simplified structure including a resin pin molded by an outsert molding method.

DESCRIPTION OF THE PRIOR ART

Conventional VCRs are designed to draw a portion of a magnetic tape out of a cassette loaded therein and to run same in a predetermined path by moving a pair of loading poles, which are respectively provided on a supply reel side and a take-up reel side, approximately a same distance along both sides of a head drum. While running through the predetermined path, the tape makes contact with a peripheral surface of the head drum, which is provided with at least one or more heads so as to record/reproduce audio and video signals onto/from the tape.

Such prior art loading devices are designed to perform both the cassette loading and the tape loading functions by means of only one loading motor. Referring to FIG. 1, there is shown such a prior art loading device. Rotatably mounted the main chassis 10 is a head drum 11 that serves to record and reproduce video signals on and from a magnetic tape. It is known that the magnetic tape may be stretched out of the tape cassette and then wound around the head drum 11 by a pair of pole bases 13 which may slide along the corresponding curvilinear loading slots 12 formed through the main chassis 10. This is typically referred to as "tape loading", as opposed to the cassette loading. The curvilinear loading slots 12 are arranged in a substantially symmetrical pattern about the head drum 11 to form a mirror image with respect to each other.

A loading motor (not shown) drives a loading cam 30 for loading a cassette onto the deck of a VCR and a tape around the head drum 11. The loading cam 30 has first and second loading grooves 31 and 32 for engaging a first elongated member 40 having a first rack gear 41 to actuate a pair of loading gears 20, 20' and a second elongated member 44 having a second rack gear 45 to actuate a function plate 60, respectively. The rotation of the loading cam 30 cause the first rack gear 40 to move along its axial direction; and, thereafter, the first rack gear 40 moves to rotate the loading gears 20, 20' about a pair of pins 21 to deploy a pair of articulated loading arms 50, thereby loading the tape around the head drum 11.

However, the above loading mechanism has a structural restriction in that the movement of the first elongated member 40, for instance, applies a substantial pressure to the pins 21, thereby requiring the use of a metal pin, which incurs an extra cost. In addition, the first elongated member 40 occupies a substantial space to complicate the structure of the deck.

SUMMARY OF THE INVENTION

Accordingly, an object of the present invention is to provide a tape loading device for use in a VCR having a simplified deck structure by replacing the first elongated member with an intermediate gear having an intermittent gear portion.

Another object of the invention is to provide a tape loading device capable of providing a cost-effective deck mechanism by employing a resin pin, in lieu of a metal pin, molded by the outsert molding method.

The above and other objects of the present invention are accomplished by means of a tape loading device for use in a video cassette recorder adapted to draw a portion of a tape out of a cassette loaded in the video cassette recorder and to load said portion in a predetermined path along the circumferential periphery of a head drum therein, which comprises:

a cam gear having a loading groove;

an elongated member engaged with the loading groove at its one end and having a rack gear at its the other end;

a transmittal gear meshed with the rack gear;

a function plate having a pair of rack gear portions, one of which is meshed with the transmittal gear;

an intermediate gear selectively engagable with the other rack gear portion of the function plate;

a loading means having a first loading gear engaged with the intermediate gear, a second loading gear engaged with the first loading gear, a pair of linkages respectively fixed to each shaft of the first and the second loading gears, and a pair of pole bases respectively fixed to one end of a lever of the linkages; and a main chassis, on which the cam gear is rotatably mounted, having a pair of loading slots formed to guide the pole bases toward the head drum.

BRIEF DESCRIPTION OF THE DRAWINGS

The above and other objects, advantages and features of the present invention will be apparent from the following description, taken in conjunction with the accompanying drawings, wherein.

DETAILED DESCRIPTION OF THE PREFERRED EMBODIMENTS

Figure 1:
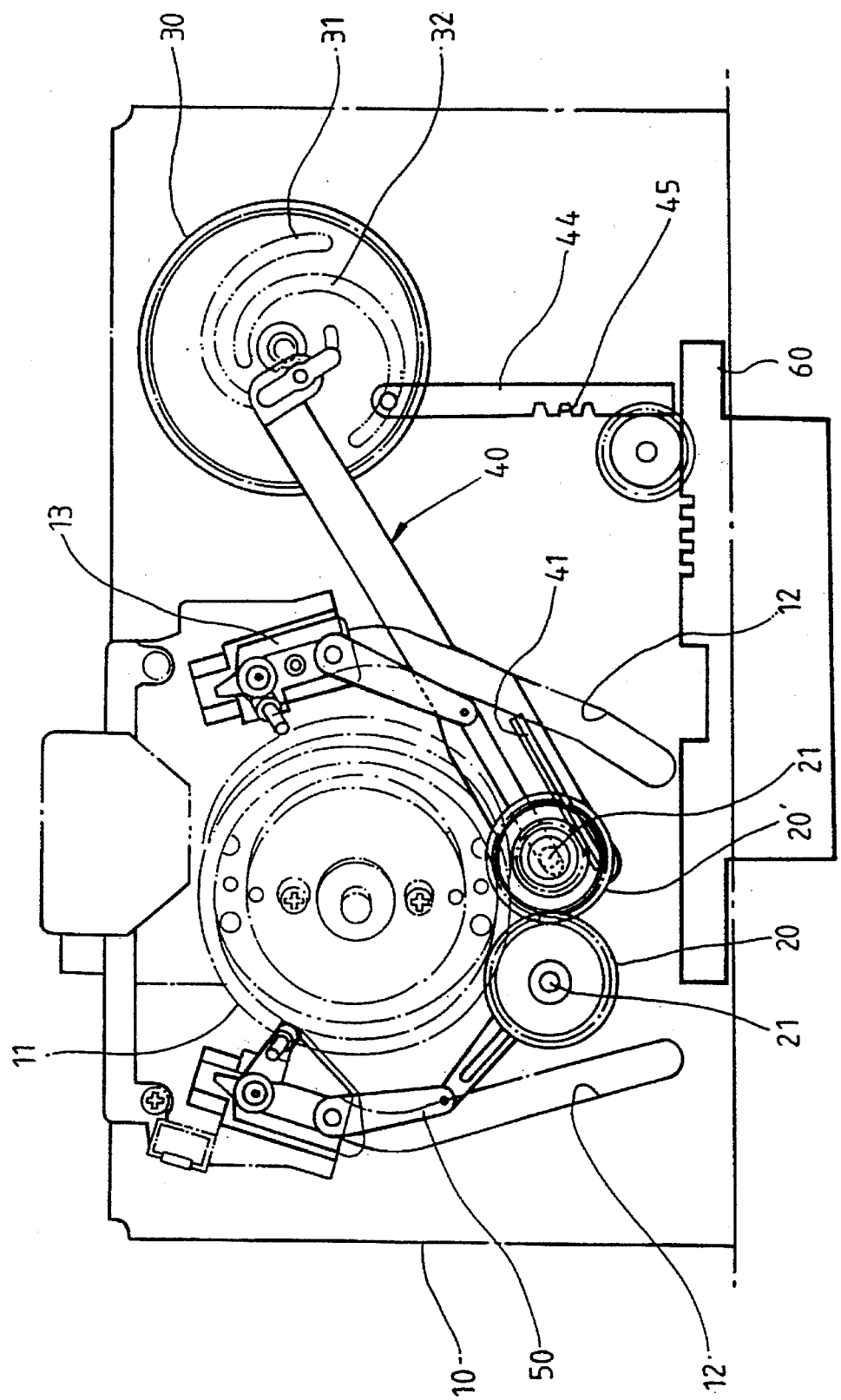
FIG.1 shows a plan view of a tape loading device of the prior art.
Figure 2:
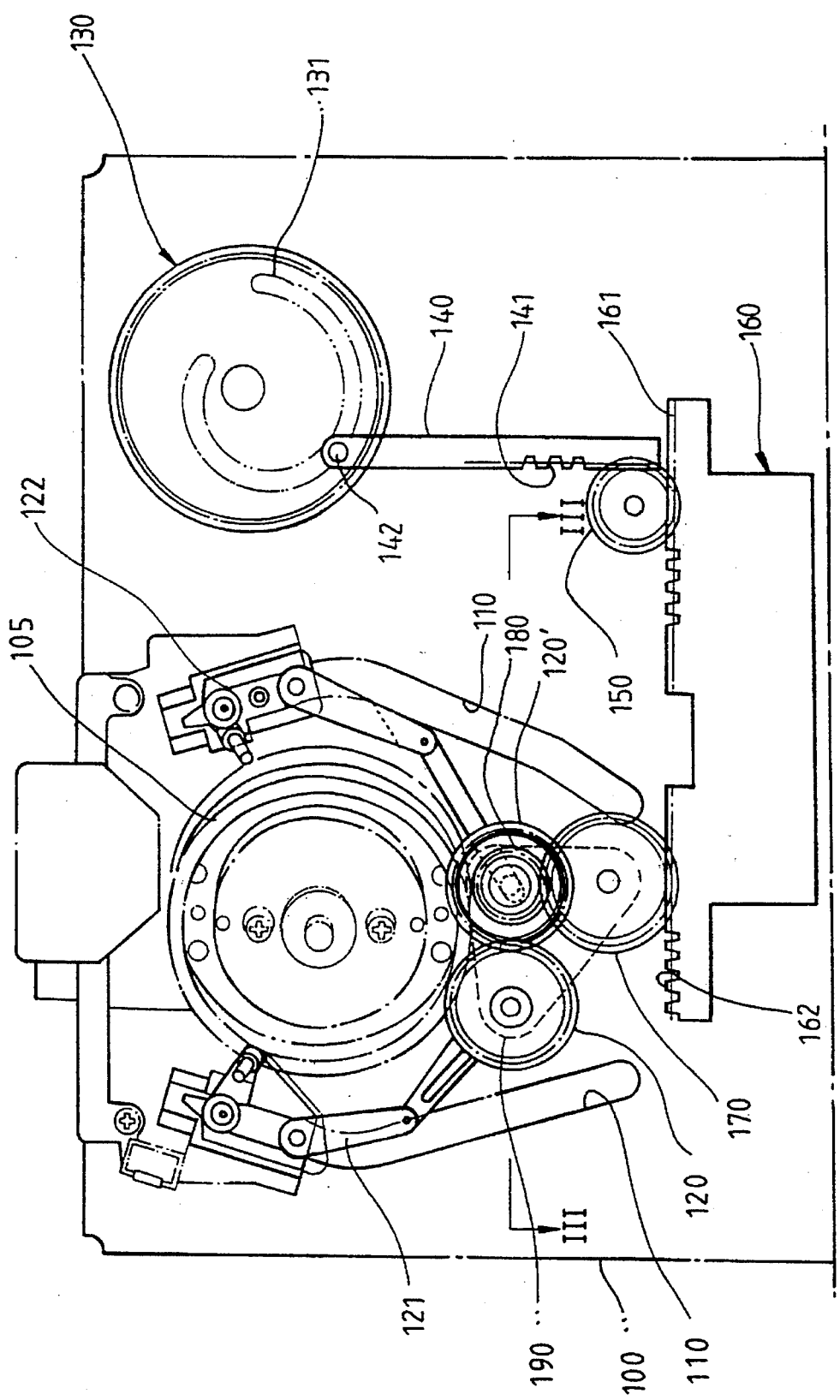
FIG. 2 illustrates a plan view of a preferred embodiment of a tape loading device in accordance with the present invention.

FIG. 2 illustrates a plan view of a preferred embodiment of a tape loading device in accordance with the present invention. As shown, the tape loading device includes a main chassis 100 having a pair of loading slots 110 to guide a pair of pole bases 122 to draw a portion of a tape out of a loaded cassette in a video cassette recorder and to load the portion in a predetermined path along the circumferential periphery of a head drum 105. A cam gear 130, driven by an electric motor(not shown), is rotatably mounted on the main chassis 100 and has a loading groove 131 for actuating an elongated member 140 engages with the loading groove 131 at its one end and having a rack gear 141 at its the other end. A rotation of the cam gear 130 causes the elongated member 140 to move upward and downward along its axial direction. A transmittal gear 150 is meshed with the rack gear 141 to rotate depending upon the movement of the elongated member 140. A function plate 160 has a pair of rack gear portions 161 and 162 at its opposite ends, one of which is meshed with the transmittal gear 150, and the other of which is selectively engaged with an intermediate gear 170 depending upon the operating mode of the recorder, thereby actuating the intermediate gear 170.

A loading means includes a first loading gear 130' having a stopped hear portion 120 engaged with the intermediate hear 170, a second loading gear 120 engaged with the first loading gear 120' a pair of linkages 121 respectively fixed to each shaft of the first and the second loading gears 120' and 120, and a pair of pole bases 122 respectively fixed to one end of a lever of the linkages 121.

Figure 3:
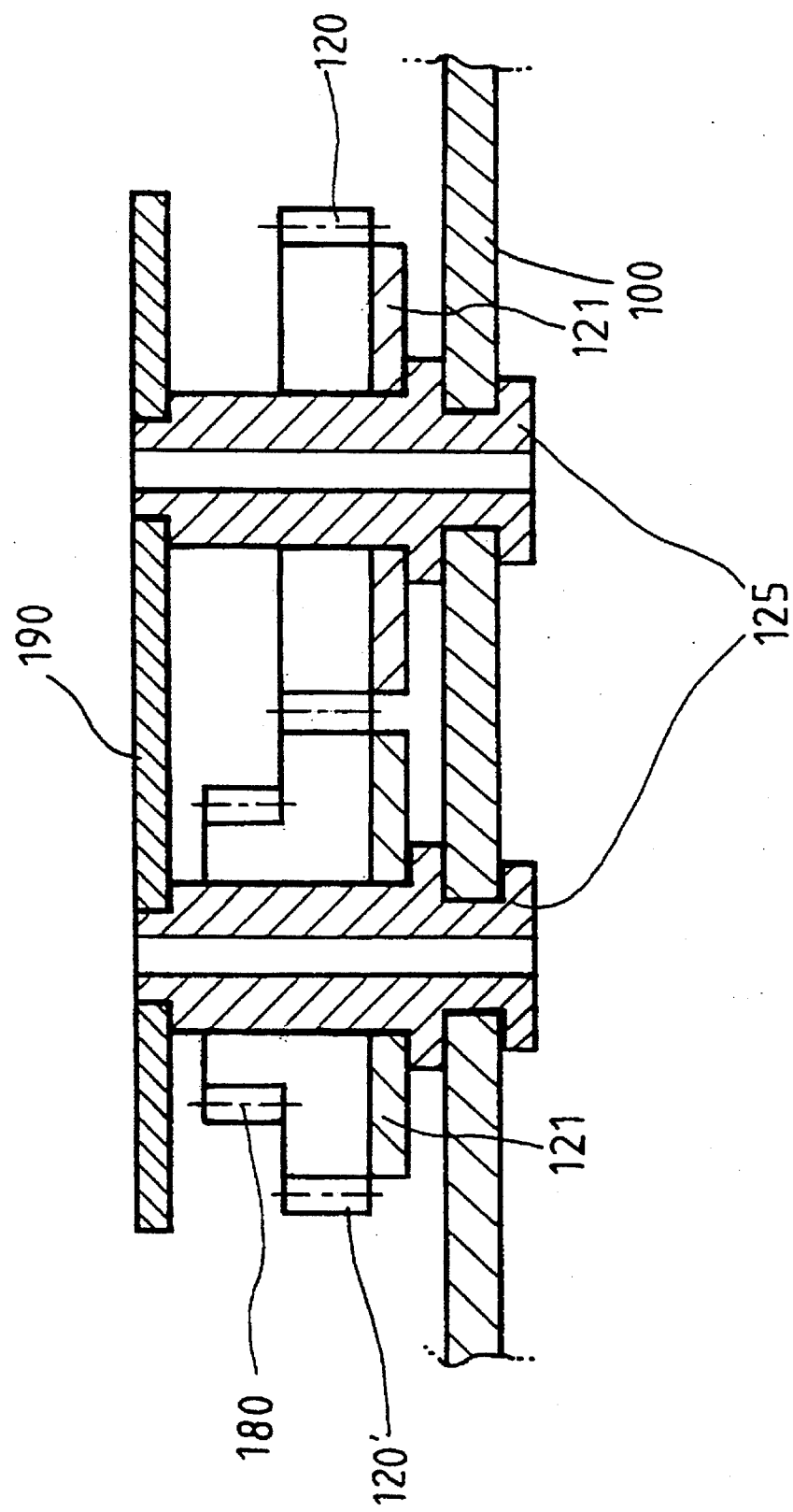
FIGS. 3 depicts a cross-sectional view taken along line III—III of FIG. 2.

FIG. 3 depicts a cross-sectional view taken along line III—III of FIG. 2. As shown, the loading gears 120 and 120' and the intermediate gear 170 (see FIG. 2) are rotatably mounted on the main chassis 100 by a number of resin pine 1:5 molded by an outsert molding method. Further, a reinforcement plate 190 is located on the stepped gear 180 through the resin pins 125 to support the resin pins 125 in position.

Although the invention has been shown and described with respect to the exemplary embodiments, it should be understood by those skilled in the art that various changes, modifications and additions may be made, without departing from the spirit and scope of the invention.

What is claimed is:

1. A tape loading device for use in a video cassette recorder for drawing a portion of a magnetic tape out of a tape cassette loaded thereinto and loading it around a head drum incorporated therein, the tape loading device comprising:

a main chassis having a pair of loading slots;

a cam gear having a loading groove, the cam gear being rotatably mounted on the main chassis;

an elongated member having a rack gear at one end, the other end thereof being fitted into the loading groove;

a transmittal gear meshed with the rack gear, the transmittal gear being rotatably mounted on the main chassis;

an intermediate gear rotatably mounted on the main chassis through an intermediate gear shaft;

a function plate having a pair of rack gear portions, one rack gear portion being meshed with the transmittal gear, the other, being selectively engaged with the intermediate gear; and a loading means including a first and a second loading gears, a pair of loading gear shafts, a pair of articulated linkages, and a pair of pole bases, wherein the first and the second loading gears are rotatably mounted on the main chassis through the loading gear shafts, respectively, the first loading gear having a stepped gear portion, the stepped gear portion being engaged with the intermediate gear, the second loading gear being engaged with the first loading gear, and the articulated linkages are fixed to the loading gear shafts at one ends, respectively, and the pole bases are fixed to the other ends of the linkages and fitted into the loading slots of the main chassis, respectively, each of the pole bases moving along the corresponding loading slot.

2. The tape loading device of claim 1, further comprising:

a reinforcement plate fixed on upper ends of the intermediate gear shaft and the loading gear shafts.

\* \* \* \* \*